June 15, 1943.     H. F. SPATZ     2,322,171
TRACTION AND ANTI-SKID DEVICE FOR VEHICLES
Filed July 1, 1941
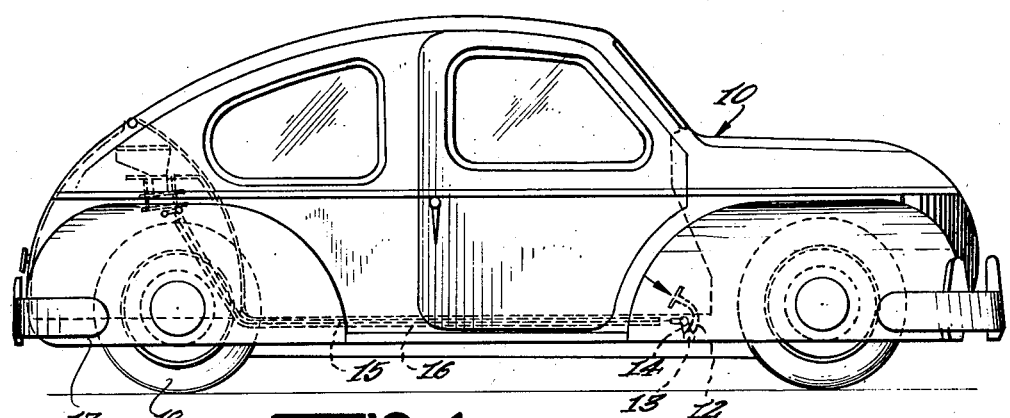
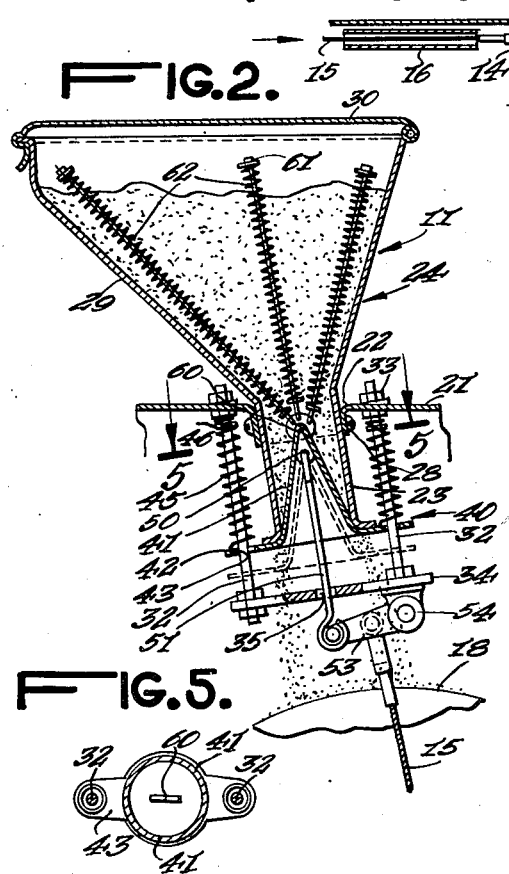
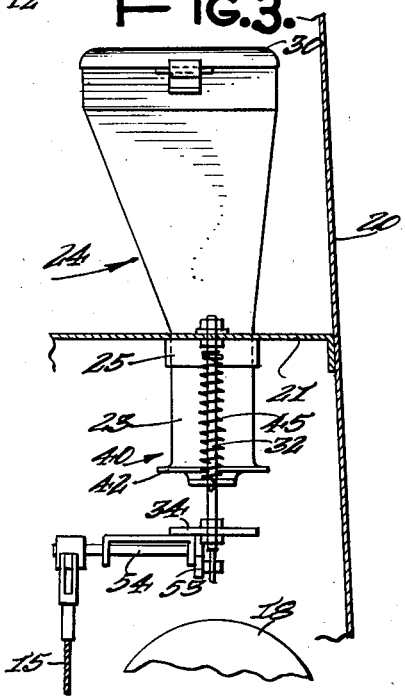
INVENTOR.
HARRY FRED SPATZ.
Carl Miller
ATTORNEY.

Patented June 15, 1943

2,322,171

UNITED STATES PATENT OFFICE 2,322,171

TRACTION AND ANTISKID DEVICE FOR VEHICLES

Harry Fred Spatz, Woodhaven, N. Y.

Application July 1, 1941, Serial No. 400,633

5 Claims. (Cl. 291—36)

This invention relates to traction and anti-skid devices for vehicles.

An object of this invention is to provide a box or receptacle fastened into the trunk compartment of a car to hold sand, salt, or fine ashes, and having slanting sides down to its lower part, so that the material therein by gravity can drop down through a spout located over the top of the rear wheels, with a stopper fitted into the receptacle and held closed by springs, and means to release the stopper to permit the material within the receptacle to drop onto the wheel, to give traction to the wheels when moving forwardly or rearwardly.

A further object of this invention is to provide means for agitating the material in the receptacle each time the stopper is opened.

Still another object of this invention is to provide a strong, durable anti-skid device of the character described, which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of an automobile provided with traction means and skid prevention means embodying the invention;

Fig. 2 is an elevational, cross-sectional view through the improved anti-skid mechanism;

Fig. 3 is a side elevational view thereof;

Fig. 4 is an elevational, cross-sectional view illustrating the foot pedal operation to control the anti-skid device; and Fig. 5 is a cross-sectional view taken on line 5—5 of Fig. 2.

Referring now in detail to the drawing, 10 designates an automobile which may be of usual construction, and provided with a traction provider and skid stopper or preventor 11, embodying the invention.

On the footboard of the automobile, is a foot pedal 12 adapted to be depressed by the driver. The foot pedal 12 is pivoted on an axis 13 to which there is fixed an upstanding arm 14. Connected to the arm 14 is one end of a flexible cable or wire 15 adapted to pass through a projecting tube 16 on the underside of the car. The tube 16 extends rearwardly beneath the car and beneath the rear fender 17 extending to above the top of the rear wheel 18, for the purpose hereinafter appearing.

Fixed to the side wall 20 of the automobile is a horizontal wall 21 located within the trunk compartment of the automobile and formed with an opening 22. Extending through the opening is a bottom tubular portion 23 of a hopper 24. Tubular portion 23 is fixed to downwardly extending flange 25 of wall 21 by means of screws 28.

The hopper 24 may have downwardly and inwardly slanting walls 29. The top of the hopper is provided with a hinged cover 30. Fixed to wall 21 are a plurality of parallel rods 32 attached to said wall by lock nuts 33. Fixed to the lower ends of the rods or bolts 32 is a transverse wall 34 disposed above the top of wheel 18. Plate 34 is formed with a central opening 35, for the purpose hereinafter appearing.

Slidably mounted on rods 32 is a stopper 40 having a central conical wall 41 projecting upwardly into the tubular portion 23 of the hopper 24. Extending outwardly from the conical portion 41 is a flat portion 42 formed with openings 43 through which the bolts 32 pass.

On rods 32 are coil tension springs 45 interconnecting the stopper 40 with collars 46 on the upper ends of the rods. The springs 45 tend to pull the stopper up to close the mouth of the hopper 24.

On the inside of conical portion 41 and adjacent the apex thereof, is an eye 50 to which is connected one end of a link 51. The link passes through opening 35 in plate 34, and the lower end thereof is connected to one end of a lever 53 pivoted to the underside of plate 34, as at 54.

The flexible cable or wire 15 is attached to the lever, so that upon depressing the foot pedal 12, the cable 15 is pulled to pull down the stopper and permit sand, salt, fine ashes or other traction material to pass from the hopper onto the top of wheel 18. When the pedal 12 is released, springs 45 pull the stopper again to closed position and also causes the pedal 12 to resume normal position as shown in Fig. 1.

On the outer surface of the apex of the stopper 40 is a plate 60 formed with a plurality of openings, and attached to said openings are radial rods 61 carrying spings or coils 62 thereon. Each time the stopper is pulled down to open the hopper, the coils 62 agitate the particles in the hopper to prevent the same from packing. Thus, the pedal 12 may be depressed to provide traction for the rear wheels to get the vehicle going and also to prevent skidding on wet or slippery pavement and on ice or snow.

It will be noted that although one sanding or anti-skid mechanism 11 has been described, such mechanism may be applied to each of the rear wheels of the vehicle. Furthermore, it will be noted that the traction material merely will drop onto substantially the top of the rear wheel, so as to be effective whether the car is going forwardly or rearwardly.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In combination with an automobile having a trunk compartment, a horizontal wall disposed within the trunk compartment of said automobile, said horizontal wall being formed with an opening, a hopper within said trunk compartment having downwardly and inwardly sloping side walls, and a downwardly extending tubular wall at the lower end of the hopper, said tubular wall projecting through the opening in said horizontal wall and fixed thereto, a pair of rods fixed to said horizontal wall and extending parallelly to said tubular wall, a transverse plate carried at the lower ends by said rods and fixed to said rods, a stopper slidably mounted on said rods, spring means to move the stopper upwardly to close the hopper, said stopper having an upwardly extending conical portion projecting into said tubular portion of the hopper, the plate carried by said rods being formed with a central opening, and a lever pivoted to the underside of said plate, a link interconnecting said lever with said stopper and passing through the opening in said plate and means attached to said lever to cause operation of said stopper.

2. In combination with an automobile, a horizontal wall disposed adjacent to a rear wall of said automobile, said horizontal wall being formed with an opening, a hopper having downwardly and inwardly sloping side walls, and a downwardly extending tubular wall at the lower end of the hopper, said tubular wall projecting through the opening in said horizontal wall and fixed thereto, a pair of rods fixed to said horizontal wall and extending parallelly to said tubular wall, a transverse plate carried at the lower ends by said rods and fixed to said rods, a stopper slidably mounted on said rods, spring means to move the stopper upwardly to close the hopper, said stopper having an upwardly extending conical portion projecting into said tubular portion of the hopper, the plate carried by said rods being formed with a central opening, a lever pivoted to the underside of said plate, a link interconnecting said lever with said stopper and passing through the opening in said plate, a foot pedal adapted to be depressed by the operator of the vehicle, and flexible cable means interconnecting the foot pedal with said lever.

3. In combination with an automobile, a horizontal wall disposed adjacent to a rear wall of said automobile, said horizontal wall being formed with an opening, a hopper having downwardly and inwardly sloping side walls, and a downwardly extending tubular wall at the lower end of the hopper, said tubular wall projecting through the opening in said horizontal wall and fixed thereto, a pair of rods fixed to said horizontal wall and extending parallelly to said tubular wall, a transverse plate carried at the lower ends by said rods and fixed to said rods, a stopper slidably mounted on said rods, spring means to move the stopper upwardly to close the hopper, said stopper having an upwardly extending conical portion projecting into said tubular portion of the hopper, the plate carried by said rods being formed with a central opening, a lever pivoted to the underside of said plate, a link interconnecting said lever with said stopper and passing through the opening in said plate, a foot pedal adapted to be depressed by the operator of the vehicle, and flexible cable means interconnecting the foot pedal with said lever, a plurality of pins fixed to the apex portion of the stopper and projecting upwardly into the hopper at various angles whereby said pins serve as guide rods and supports for said agitating means.

4. In combination with an automobile, a horizontal wall disposed adjacent to a rear wall of said automobile, said horizontal wall being formed with an opening, a hopper having downwardly and inwardly sloping side walls, and a downwardly extending tubular wall at the lower end of the hopper, said tubular wall projecting through the opening in said horizontal wall and fixed thereto, a pair of rods fixed to said horizontal wall and extending parallelly to said tubular wall, a transverse plate carried at the lower ends by said rods and fixed to said rods, a stopper slidably mounted on said rods, spring means to move the stopper upwardly to close the hopper, said stopper having an upwardly extending conical portion projecting into said tubular portion of the hopper, the plate carried by said rods being formed with a central opening, a lever pivoted to the underside of said plate, a link interconnecting said lever with said stopper and passing through the opening in said plate, a foot pedal adapted to be depressed by the operator of the vehicle, flexible cable means interconnecting the foot pedal with said lever, a plurality of pins fixed to the apex portion of the stopper and projecting upwardly into the hopper at various angles, and a coil on each radial pin to agitate the material within the hopper.

5. In combination with an automobile, a horizontal wall disposed adjacent to a rear wall of said automobile, said horizontal wall being formed with an opening, a hopper having downwardly and inwardly sloping side walls, and a downwardly extending tubular wall at the lower end of the hopper, said tubular wall projecting through the opening in said horizontal wall and fixed thereto, a pair of rods fixed to said horizontal wall and extending parallelly to said tubular wall, a transverse plate carried at the lower ends by said rods and fixed to said rods, a stopper slidably mounted on said rods, spring means to move the stopper upwardly to close the hopper, said stopper having an upwardly extending conical portion projecting into said tubular portion of the hopper, the plate carried by said rods being formed with a central opening, a lever pivoted to the underside of said plate, a link interconnecting said lever with said stopper and passing through the opening in said plate, a foot pedal adapted to be depressed by the operator of the vehicle, flexible cable means interconnecting the foot pedal with said lever, a plurality of pins fixed to the apex portion of the stopper and projecting upwardly into the hopper at various angles, and a coil on each radial pin to agitate the material within the hopper.

HARRY FRED SPATZ.